INVENTOR.
Henry S. Sommers, Jr.
BY Morris Rabkin
ATTORNEY.

THERMOELECTRIC APPARATUS

Filed Dec. 26, 1962 4 Sheets-Sheet 2

INVENTOR.
Henry S. Sommers, Jr.
BY Morris B. Rabkin
ATTORNEY.

THERMOELECTRIC APPARATUS

Filed Dec. 26, 1962 4 Sheets-Sheet 3

INVENTOR.
Henry S. Sommers, Jr.
BY
Morris B. Rabkin
ATTORNEY.

INVENTOR.
Henry S. Sommers, Jr.
BY
Morris Rabkin
ATTORNEY.

United States Patent Office 3,212,272

Patented Oct. 19, 1965

3,212,272
THERMOELECTRIC APPARATUS

Henry S. Sommers, Jr., Princeton, N.J., assignor to Radio Corporation of America, a corporation of Delaware Original application July 30, 1957, Ser. No. 675,211. Divided and this application Dec. 26, 1962, Ser. No. 247,190

8 Claims. (Cl. 62—3)

The present invention relates to thermoelectric apparatus, and more particularly to systems for effecting a change of state of material using thermoelectric heat pumps. This application is a division of an application filed by Henry S. Sommers, Jr., Serial No. 675,211, on July 30, 1957 for Thermoelectric Apparatus.

Thermoelectric heat pumps of the type suitable for use in systems provided by the present invention operate in accordance with the Peltier effect. Basically, such heat pumps include a body of material having a high thermoelectric power, such as a semiconductor, bonded between a pair of metal electrodes. When current passes through the heat pump, one of the electrodes provides a cold junction which absorbs heat from the ambient, while the other electrode provides a hot junction which releases heat to the ambient. In this way, heat is pumped through the thermoelectric heat pump from one junction to the other and a temperature gradient is established thereacross. An amount of energy is expended in pumping heat to a higher temperature across the temperature gradient. In accordance with the invention, a thermoelectric heat pump is utilized with optimum efficiency upon minimization of the temperature gradient. The invention is described herein as applied in a novel system for effecting a change of state or physical phase in a material which is liquid at normal, ambient temperatures, and in particular to systems for the distillation of water by a cyclic change of state process.

The availability of a huge supply of pure water is essential to modern human existence. The largest and most accessible supply of water resides in the sea. However, the saline content of sea water is too high to make it suitable for human consumption. It has been proposed heretofore to distill sea water, thereby providing an almost inexhaustible supply of fresh water. Such proposals have not been extensively accepted, due to their being economically unfeasible. Prior apparatus for distilling sea water has been difficult to construct, extremely complex, or excessively bulky. Due to the novel incorporation of thermoelectric heat pumps, a system provided by the present invention may be smaller, simpler, and less expensive to operate than those heretofore proposed.

Briefly described, the invention involves the use, in a system for effecting a change of state, of a unit wherein changes of state cyclically take place. The unit may comprise a structure which is internally compartmentalized by thermoelectric heat pumps. A different compartment is provided on opposite sides of each of the heat pumps. In one of the compartments, a change of state or phase of one type is effected while a change of state or phase of the type opposite thereto takes place simultaneously in the other compartment. For example, water may be evaporated or frozen in the one compartment and, respectively, condensed or melted in the other compartment. The thermoelectric heat pumps are structurally adapted to obtain maximum heat pumping efficiency by virtue of the disposition of the compartments in which the changes of state are effected in minimizing the temperature drop across each of the heat pumps.

It is therefore an object of the present invention to provide more efficiently operating thermoelectric apparatus.

It is a further object of the present invention to provide improved systems for cyclically effecting changes of state or phase which are suitable for use in purifying liquid mediums.

It is a still further object of the present invention to provide improved systems for effecting changes in state which incorporate, in a novel manner, improved thermoelectric apparatus.

It is a still further object of the present invention to provide systems for effecting changes of state which may be simpler, less complex, smaller in size, and which have lower operating costs than such systems which have been heretofore available.

Other objects and advantages of the present invention will, of course, become apparent and immediately suggest themselves to those skilled in the art to which the invention is directed from a reading of the following description in connection with the accompanying drawings in which.

Figure 1:
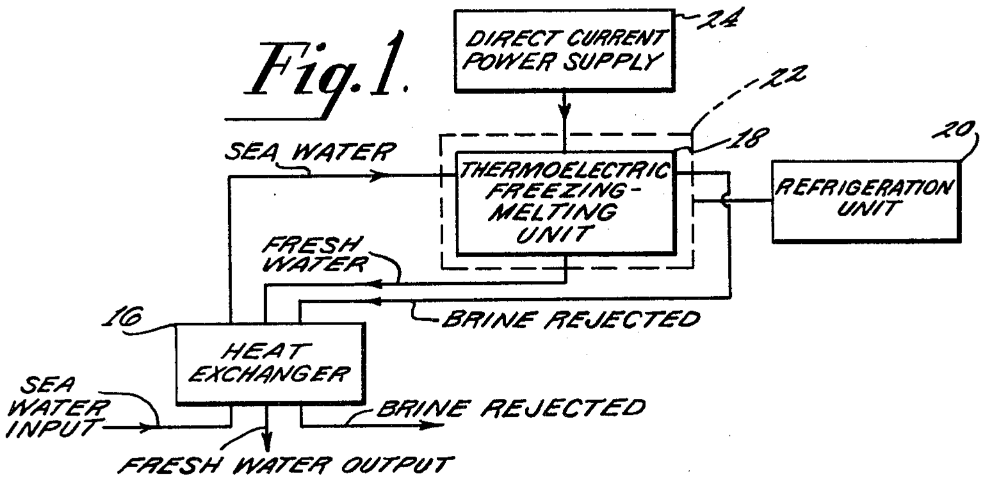
FIG. 1 is a flow chart showing the operation of a system incorporating the invention.

Referring more particularly to the drawings, purification of sea water is effected in the system shown in FIG. 1 by means of freezing and then melting the sea water in accordance with a cyclic process. The sea water is initially passed through a heat exchanger 16, wherein it is precooled. After leaving the heat exchanger, the sea water is introduced into a thermoelectric freezing-melting unit 18. The unit 18 is described in detail hereinafter. Briefly, it incorporates a novel structure including thermoelectric heat pumps for cyclically freezing the sea water into ice and thereafter melting the ice to provide fresh water. Since the freezing and melting operation takes place at a temperature of approximately 32 degrees Fahrenheit, which is normally below the ambient temperature, a refrigeration unit 20, which may be of any conventional type, is used to cool a chamber 22 in which the thermoelectric freezing-melting unit is located. The chamber 22 may be an insulated box and is illustrated in FIG. 1 by dash lines. A direct current power supply 24, for example of known design, is used to provide operating power for the thermoelectric heat pumps in the thermoelectric freezing and melting unit 18. Both fresh water and brine are produced in the thermoelectric freezing-melting unit. The fresh water and the brine pass through the heat exchanger 16 so as to precool the input sea water. The brine is rejected, as by being pumped back into the sea, and the fresh water is available for consumption.

Figure 2:
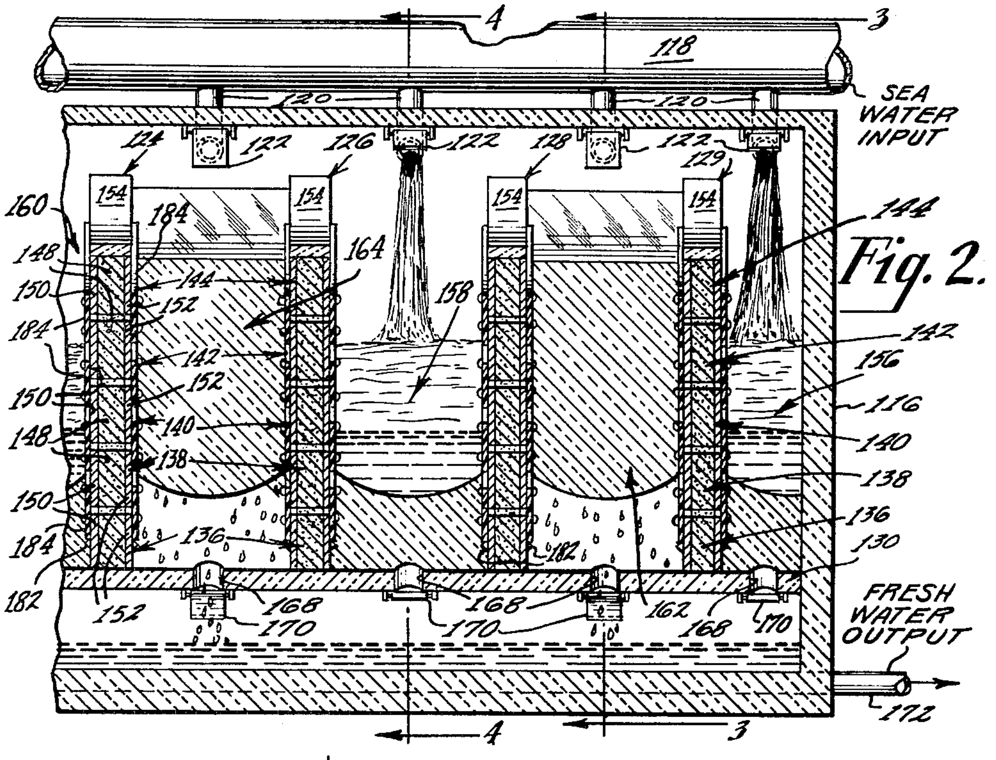
FIG. 2 is a fragmentary, sectional view of one form of thermoelectric freezing-melting unit suitable for use in the system illustrated in FIG. 1, the section being taken along the line 2—2 of FIG. 3.
Figure 3:
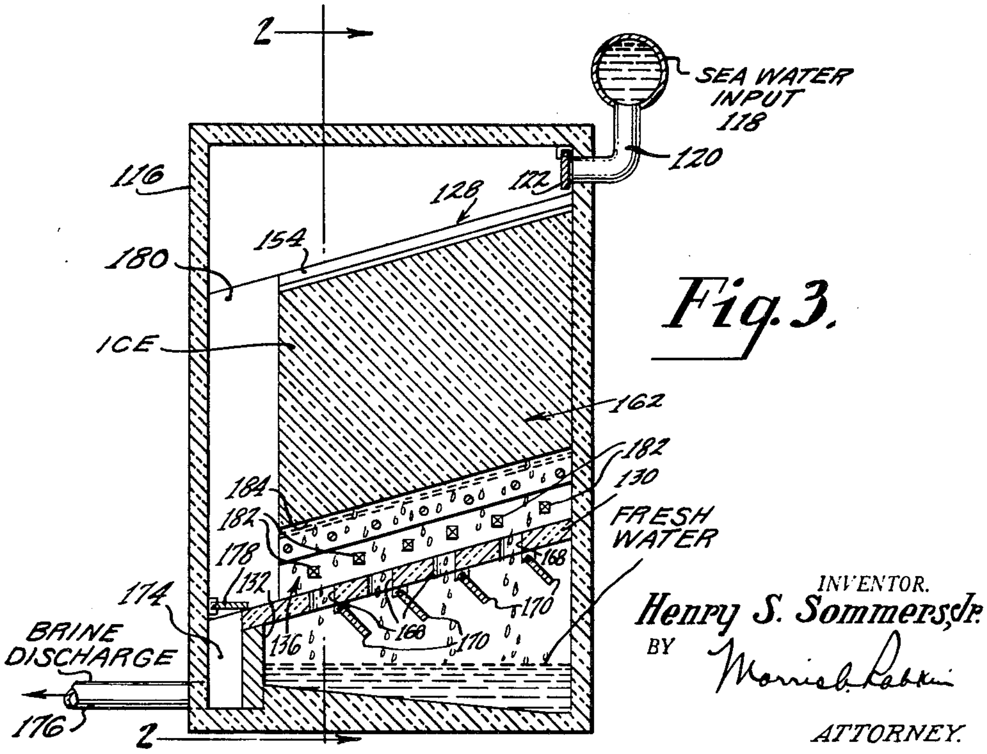
FIG. 3 is a sectional view taken along the line 3—3 of FIG. 2.
Figure 4:
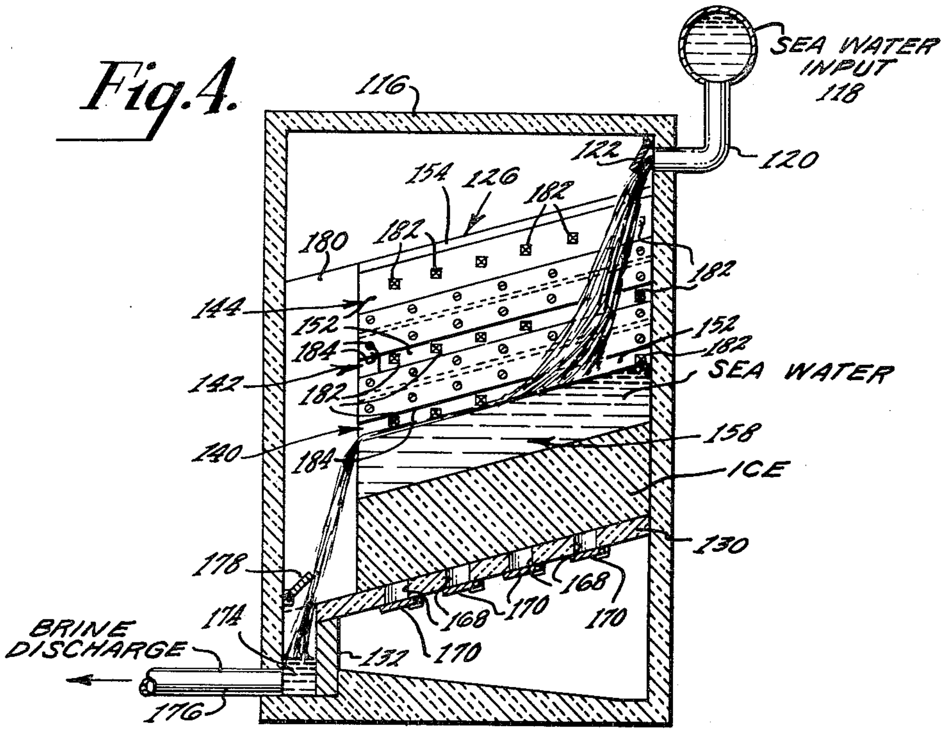
FIG. 4 is a sectional view taken along the line 4—4 of FIG. 2.

One form of thermoelectric freezing-melting unit which can be used in the system shown in FIG. 1 is structurally illustrated in FIGS. 2, 3 and 4. The unit is enclosed in a container 116 which may be made from insulating, refractory material such as ceramic material. The sea water is fed into a manifold 118. The manifold 118 is connected by way of conduits 120 into the container 116. Valves 122, which are schematically illustrated as incorporating a flap-operated mechanism, control the flow of sea water from the conduits 120 into the container 116. A plurality of thermoelectric heat pump panel units 124, 126, 128 and 129 are disposed on an inclined plate 130. The plate 130 is supported on a stanchion plate 132 and at a side wall of the container 116. The inclined plate 130 may be composed of insulating refractory material and has a plurality of rows of apertures 168 therein. The portions of the plate 130 around the apertures 168 provide seats for flap valves 170.

Each of the heat pump panel units 124, 126, 128 and 129 is provided by a plurality of thermocouple elements 136, 138, 140, 142 and 144. These elements are each in the shape of a parallelepiped. A body of thermoelectrically active material 148, such as a semi-conductor, is sandwiched between a pair of conductive junction plates 150 and 152 to provide each of the thermoelectric elements 136, 138, 140, 142 and 144. The junction plates 150 and 152 are connected, to adjacent junction plates to provide the panel array of thermocouple elements for each of the heat pump panel units 124, 126, 128 and 129. Connector plates 184 of insulating material, such as a structurally strong, laminated, thermosetting plastic, are fastened to each adjacent junction plate 150 and 152. A bar of insulating material 154 is attached at the top of each of the heat pump units 124, 126, 128 and 129.

The heat pump units 124, 126, 128 and 129 define a plurality of compartments in the container 116. Adjacent ones of these compartments are freezing compartments and melting compartments, respectively. During one phase of the cycle of operation of the freezing-melting unit, the compartments 156, 158 and 160 function as freezing compartments, while the other compartments 162 and 164 function as melting compartments. The freezing-melting unit 18 is illustrated in the drawings when operating at an interval during one phase of the cycle of operation. However, during the next phase of the cyclical operation of the freezing-melting unit 18, the compartments reverse in function. The compartments 156, 158 and 160 then operate as melting compartments, and the compartments 162 and 164 operate as freezing compartments.

The region between the bottom of the inclined plate 130 and the bottom of the container 116 provides a reservoir for fresh water. An oulet pipe 172 is connected to the reservoir to extract the fresh water therefrom. In front of the thermoelectric heat pump panel units 124, 126, 128 and 129 (to the left in FIG. 3 and FIG. 4), and between the side walls of the compartment 116, there is disposed a region or reservoir 174 for the collection of concentrated sea water or brine. This brine flows through the compartments formed by the heat pump units into the reservoir 174. The brine from this reservoir is discharged through a pipe 176. A valve 178, illustratively shown as a flap valve, closes the brine reservoir 174 during selected periods of operation of the device. As shown in FIGS. 3 and 4, a vertically disposed plate 180, which may be constructed of insulating material, is attached between the end of each of the heat pump panel units 124, 126, 128 and 129 and the left side wall of the container 116 and guides the flow of the sea water and brine from each compartment into the brine reservoir 174.

In operation, the freezing-melting unit which is contained in the container 116 is maintained at approximately the freezing point of water, namely zero degrees centigrade, by means of an auxiliary refrigeration unit, as shown in FIG. 1. The sea water is permitted to flow into the alternate compartments 156, 158 and 160 by opening certain of the valves 122 at the terminals of the corresponding conduits 120. The valves 170 close the apertures 168 at the bottom of these compartments 156, 158 and 160 as shown in FIG. 4. The valves leading into the brine discharge reservoir 174 from each of the compartments 156, 158 and 160 are maintained open, as also shown in FIG. 4. Sea water flows through each of the compartments 156, 158 and 160. The heat pump units 124, 126 and 128 and 129 are operated, in a manner to be described in detail hereinafter in connection with FIG. 5, so that layers of fresh water ice form in each of the compartments 156, 158 and 160. Since, when salt water freezes, the salt content tends to remain in the liquid, the ice formed in each of the containers 156, 158 and 160 will be essentially salt free. The more concentrated sea water passes into the brine reservoir 174 and is discharged through the pipe 176. Formation of progressively higher layers of ice in each of the compartments 156, 158 and 160 is provided by energizing different ones of the thermocouple elements 136, 138, 140, 142 and 144 in the heat pumps 124, 126, 128 and 129 at different times. For example, the lowest one of the thermocouple elements is energized first and until a layer of ice forms in the adjacent region of the compartments 156, 158 and 160 and grows sufficiently to fill this region of the compartment with ice. Then, the next higher thermocouple element is energized so that the ice grows to also fill this region of the compartments 156, 158 and 160. By progressively raising the position of the interface at which ice formation occurs, it is possible to fill the compartments entirely with fresh water ice. In the past, freezing-melting methods of distillation have not proven successful, since a considerable amount of sea water occluded to the small ice crystals which were formed. By controlled freezing of sea water, in accordance with the invention, it is possible to provide pure ice. This ice is subsequently melted to provide fresh water.

When the compartments 156, 158 and 160 are completely full of ice, the cycle is reversed. The junction plates 152 and 150 of the heat pumps 124, 126, 128 and 129, which were arranged to be cold junctions for freezing purposes, are reversed in their operation to become hot junctions so as to melt the ice. The cyclic process may be continual.

A stage in the process is shown in FIGS. 2, 3 and 4. At this stage, the compartments 156, 158 and 160 are functioning as freezing compartments, while the compartments 162 and 164 operate as melting compartments. It may be observed that projections 182 extend from the junction plates 150 and 152 into the compartments to prevent the ice formed therein from slipping downwardly.

Sea water is permitted to flow through the valves 122 into the compartments 156, 158 and 160. The valves 122 which lead to the other compartments 162 and 164 are closed. Correspondingly, the valves 170 at the bottom of the compartments 162 and 164 are open for the passage of melting ice water therethrough, whereas the valves 170 at the bottom of the compartments 156, 158 and 160 are closed to prevent the water from flowing therethrough while ice is forming in these compartments. The brine discharge valves 178 are open in the ice forming compartments 156, 158 and 160 for the discharge of brine therefrom, whereas these valves are closed in the melting compartments to prevent any melting fresh water from escaping into the brine discharge reservoir 174. Ice progressively grows upwardly in the ice forming compartments 156, 158 and 160. The interface between the sea water and the ice rises gradually. In the melting compartments, ice has been formed and is melting from the bottom interface. This melting ice passes as ice water, through the apertures 168 on the bottom of the respective compartments, into the fresh water output reservoir and thence out of the fresh water output pipe 172. As was mentioned heretofore, only one thermocouple element at a time is energized in each of the heat pump panels 124, 126, 128 and 129. This element is the element adjacent to the interface. Freezing the ice water at one level as the water flows over the interface permits the formation of pure ice without excessive occlusion of salt therein. The small temperature gradient between the adjacent compartments and across each heat pump unit 124, 126, 128 and 129 provides for greater efficiency of operation. Moreover, heat absorbed from the freezing water is efficiently pumped for use in melting the fresh water ice in the adjacent compartment.

Figure 5:
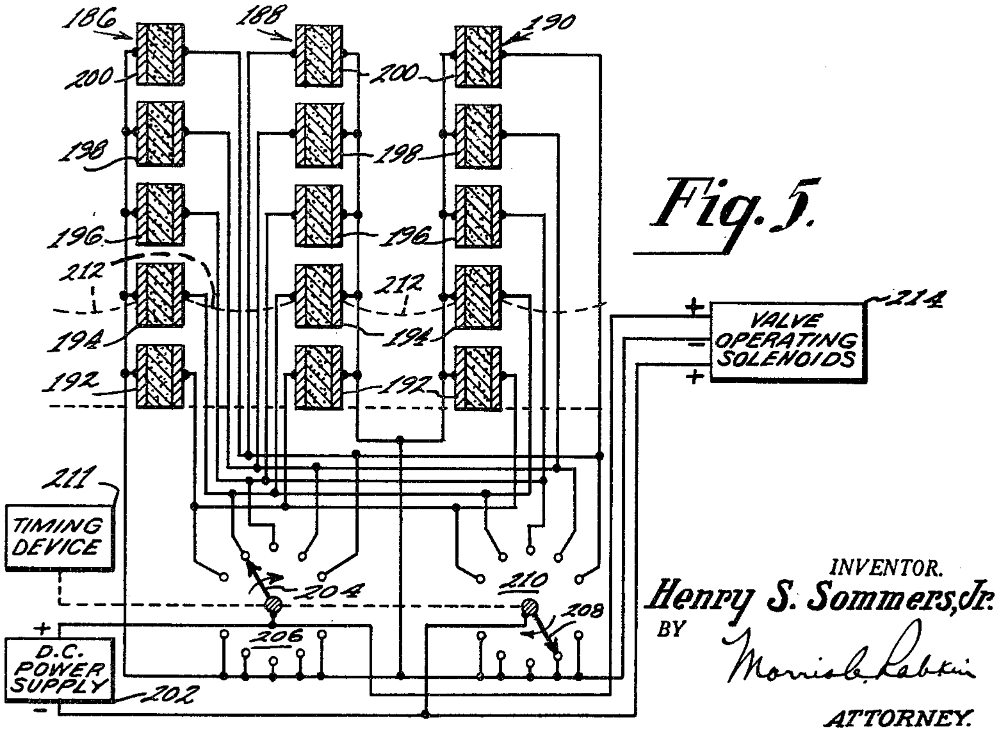
FIG. 5 is a simplified, schematic diagram showing the electrical connection of the thermoelectric freezing-melting unit illustrated in FIGS. 2, 3 and 4.

Referring now to FIG. 5, circuitry for cyclically changing the operation of the freezing-melting unit 18 is shown. Only three heat pumps are shown for purposes of simplified illustration. They are designated by the reference numerals 186, 188 and 190. Each of the heat pumps is provided by a plurality of thermocouple elements 192, 194, 196 and 198 and 200. The junction plates of each of the thermocouple elements are connected to the terminals of a pair of rotary switches 206 and 210. These switches are simultaneously actuated, as by a timing device 211, such as includes a clock motor. A direct-current power supply 202 is connected to the rotating arms 204 and 208 of the switches 206 and 210. The positive terminal of the direct-current power supply is connected to the arm 204 of one switch 206. The negative terminal of the direct-current power supply 202 may be connected to the rotating arm 208 of the other switch 210. In the position of the switches illustrated, the thermocouple element 194 of each of the heat pump units 186, 188 and 190 is energized. It is assumed that the ice-water interface, illustrated by the dash line 212, is disposed adjacent to the junction plates of the energized thermocouple element 194. As the switch progresses, successively higher ones of the thermocouple elements 196, 198 and 200 are activated. After the thermocouple element 200 is activated, the lowest one of the thermoelectric elements 192 is again activated. However, this thermocouple element 192 is now activated in the opposite sense, so that its junctions are reversed. The operation of the unit may be cyclical and continual. It will be observed that the change from the melting cycle to the freezing cycle results from the reversal of the direction of current flow. Connected to the switches 206 and 210 and the power supply 202 may be a number of solenoids 214 for operating the valves in the sequence above set forth.

There has therefore been described a unique system for purifying sea water to provide fresh water therefrom. The system is, as may be observed, much less complicated than systems for this purpose which were heretofore available. The principle of operation involved may be used in other systems for effecting a change of phase by use of thermoelectric heat pump apparatus. For example, by a rearrangement of the switching and valve sequence, a series of molten and solid zones can be made to pass upwardly through each cell, thus making the unit into a regenerative zone purifier. This will permit the adaptation of the high thermal efficiency of the thermoelectric heat pump to the zone purification of materials.

Figure 7:
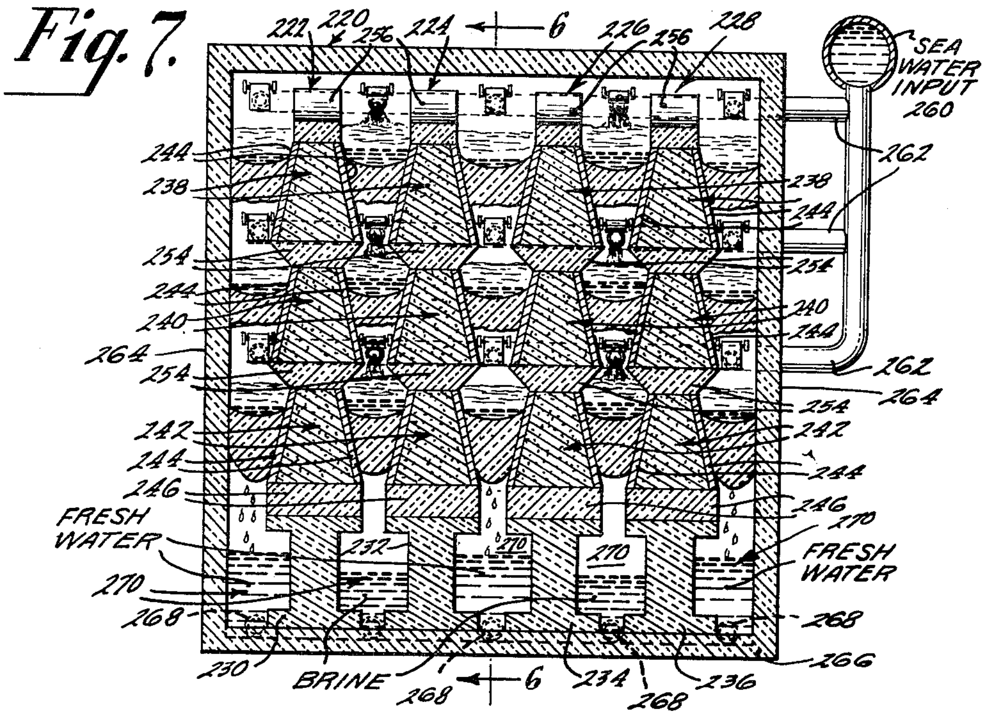
FIG. 7 is a sectional view taken along the line 7—7 of FIG. 6 as viewed in the direction of the arrows.
Figure 6:
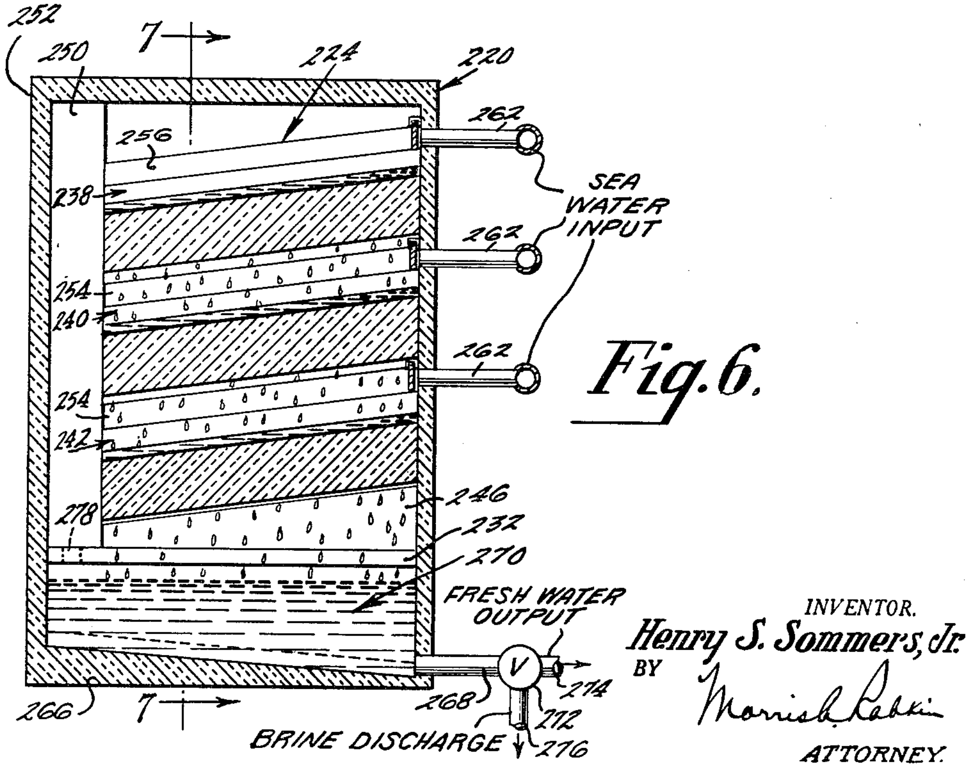
FIG. 6 is a sectional view of another embodiment of a thermoelectric freezing-melting unit constructed in accordance with the present invention and useful in the system illustrated in FIG. 1, the section being taken along line 6—6 of FIG. 7.

Another embodiment of a freezing-melting unit provided by the present invention is illustrated in FIGS. 6 and 7. A container 220 of insulating material, for example, some refractory insulating material such as a ceramic, includes a number of heat pump units 222, 224, 226 and 228 which are arranged vertically and supported on I beams 230, 232, 234 and 236, respectively. These beams may be constructed from the same material as the container 220. Each of the heat pumps consists of a plurality of thermocouple elements 238, 240, 242, only three of which are shown for purposes of simplifying the illustration. Each element is in the form of a tapered bar of some thermoelectrically active material. Metal plates 244 are in conductive contact with the side surfaces of the bars of thermoelectrically active material. Tapered cells are formed between the thermoelectric elements of adjacent heat pump units at each level of the respective thermocouple elements. The narrow extremity of these cells is disposed at the bottom thereof. The bottom-most thermoelectric element rests on a bar 246 of insulating material, the respective bars 246 resting upon the I beams 230, 232, 234 and 236. A vertical bar 250 of insulating material is disposed between the front of each of the thermoelectric heat pump units and a front wall 252 of the container 220. Bars 254 of insulating material, which are tapered, separate each of the thermoelectric elements 238, 240, 242. Other bars 256 of insulating material are disposed on the tops of the upper thermocouple elements 238.

A sea water input manifold 260 is connected through a series of pipes 262 into the container 220. A different pipe leads into each group of the cells formed at the various thermocouple element levels between the adjacent thermocouple elements and between the end thermocouple elements and the end walls 264 of the container 220. Flap valves similar to the valves 122 used in FIG. 2 control the flow of sea water from the respective pipes 262 into the various cells.

The floor 266 of the container 220 is sloped gently (as seen in FIG. 6), and conduits 268 leading from the container 220 are disposed at the lower-most level of the floor 266. A conduit 268 is connected at the bottom of the container in each of a plurality of fluid collection chambers 270 formed by the surfaces of the I beams 230, 232, 234 and 236. A two-way distribution valve 272 is connected to each of the conduits 268 for channeling the fluid collected in the chambers 270 to either one of a fresh water output conduit 274 or a brine discharge conduit 276.

In operation, the heat pumps 222, 224, 226 and 228 are activated, as by being connected in parallel to a common source of direct current. The current through each of the thermocouple elements 238, 240 and 242 is polarized so that adjacent ones of the metal plates 244 which form the junctions of the thermocouple elements 238, 240 and 242 provide either hot (heat discharging) junctions or cold (heat absorbing) junctions. Freezing and melting of fresh water ice occurs simultaneously in alternates ones of the cells. The valves coupled to the pipes 262 admit salt water into the cells between alternate pairs of adjacent pumps 222, 224, 226 and 228. Thus, the cells between pairs of adjacent heat pumps 222, 224 and heat pumps 226, 228 are cells in which freezing takes place. The valves leading into these cells are open, as indicated in the drawing, and sea water enters therein. Because of the tapered construction of the cells, freezing will start in the constricted bottom thereof and the ice-salt water interface will rise in each of the cells until all of the cells are filled with pure ice.

The thermocouple elements 238, 240 and 242 are tilted downwardly from the sea water input side of the container 220 to the front side 252 thereof, as seen in FIG. 6. Thus, the salt water will flow down in each compartment, through the duct formed by adjacent ones of the vertical bars 250, and through the openings 278 near the front end of each of the I beams 230, 232, 234 and 236. This overflow sea water, which is not frozen, will be more concentrated since some fresh water is extracted therefrom to form ice in the cells and the overflow sea water may be considered to be brine. This brine will collect in the chambers 270 formed between the I beams 230 and 232 and between the I beams 234 and 236 and will be withdrawn through the conduits 268 thereof. The distributing valve 272 is adjusted so that this brine flows through the brine discharge conduit 276. At the same time, ice which has already been formed in the cells between other heat pump units, as between the units 224 and 226, will be melted by the hot junction plates 244 of the thermocouple elements 238, 240 and 242. The valve leading into these cells between the heat pump units 224 and 226 are closed at this time so that salt water cannot enter them. The fresh water ice in the melting cells melts at both the top and bottom and flows downwardly along the inclined surfaces of the ice into the chambers 270 between the I beam members 232 and 234. Also, the water from the melted ice in the upper ones of the cells falls into the cells immediately beneath and assists in melting the ice contained in the lower cells. The ice melts first at the heated walls of the thermocouple elements, and the tapered blocks of ice will gradually settle. Because of the settling of the ice in the cells, a final segment of ice will be left in the constricted bottoms of each of the cells at the end of a melting cycle. These segments of ice will serve as seeds to facilitate the growth of fresh water ice in the freezing part of the cycle, thus assuring the proper growth of pure ice, free from salt occlusions.

The process is cyclical so that freezing and melting occurs successively in the same cells. Some advantages of the embodiment of the invention illustrated in FIGS. 6 and 7 are that all of the thermocouple elements 238, 240 and 242 in all of the heat pump units 222, 224, 226 and 228 operate simultaneously. In other words, the duty cycle of the equipment is 100 percent. The thermal efficiency of the apparatus is also increased since melting occurs directly at the walls of the thermocouple elements, that is, at the metal junction plates 244. The melting occurs first at the heated metal plates 244 and the ice settles as it melts at the surface thereof. Because of the constricted ends of the cells, the maintenance of a seed of pure water ice is possible to facilitate the growth of pure ice during the freezing cycle.

What is claimed is:

1. In a system for purifying a fluid medium, the combination comprising a plurality of thermoelectric heat pump units having hot and cold junctions on opposite sides thereof, at least one of said heat pump units being disposed with the hot junction side thereof opposite the hot junction side of one of said heat pump units adjacent thereto and with the cold junction side thereof opposite the cold junction side of another of said heat pump units adjacent thereto so as to define a pair of compartments on opposite sides thereof, means for passing said fluid medium through the one of said compartments defined by said cold junction sides for progressively freezing said fluid medium to purify said medium, the heat developed in the one of said compartments formed by said hot junction sides being adapted to melt previously frozen, purified bodies of said fluid medium disposed therein, and means for selectively withdrawing said purified fluid medium from said compartments in the fluid state.

2. In a system for purifying a fluid medium, the combination comprising a plurality of thermoelectric heat pump units having hot and cold junctions on opposite sides thereof, at least one of said heat pump units being disposed with the hot junction side thereof disposed opposite the hot junction side of one of said heat pump units adjacent thereto and with the cold junction side thereof opposite the cold junction side of another of said heat pump units adjacent thereto so as to define a pair of compartments on opposite sides thereof, a container for housing said heat pump units, said container including at least one inclined plate for supporting said heat pump units with said compartments vertically disposed above said plate, said plate and the bottom wall of said container cooperating to define a reservoir therebetween, valve means in said inclined plate at the bottom of each of said compartments for selectively withdrawing therefrom into said reservoir fluid which has been purified, other valve means in said container for selectively admitting into said compartments said fluid medium to be purified so that said fluid medium flows in a direction downwardly along said inclined plate, means communicating with said container for withdrawing said fluid medium admitted therein by said other valve means, said last-named means being disposed near the lower end of said inclined plate, and means for controlling said valve means for opening those of said first-named valve means leading to those of said compartments defined by said hot junction sides and for opening those of said other valve means for admitting fluid into those of said compartments defined by said cold junction sides.

3. In a system for purifying a fluid medium, the combination comprising a plurality of thermoelectric heat pump units having hot and cold junctions on opposite sides thereof, at least one of said heat pump units being disposed with the hot junction side thereof opposite the hot junction side of one of said heat pump units adjacent thereto and with the cold junction side thereof opposite the cold junction side of another of said heat pump units adjacent thereto so as to define a pair of compartments on opposite sides thereof, each of said heat pump units comprising a plurality of thermocouple elements, each of said elements being provided by a body of thermoelectrically active material disposed between conductive junction members, said elements being disposed with said junction members aligned to form said hot and cold junction sides of said heat pump units, and means for energizing said thermocouple elements by passing direct current therethrough, said energizing means being operative to cyclically change the direction of flow of said direct current.

4. In a system for purifying a fluid medium, the combination comprising a plurality of thermoelectric heat pump units having hot and cold junctions on opposite sides thereof, at least one of said heat pump units being disposed with the hot junction side thereof opposite the hot junction side of one of said heat pump units adjacent thereto and with the cold junction side thereof opposite the cold junction side of another of said heat pump units adjacent thereto so as to define a pair of compartments on opposite sides thereof, each of said units comprising a plurality of thermocouple elements, each of said elements being provided by a body of thermoelectric material and conductive members on opposite surfaces of said body, said elements being aligned with each other in a column extending between the ends of said compartments, and direct current power supply means for energizing individual ones of said thermocouple elements in each of said heat pumps in sequence, the elements adjacent one of the ends of each of said compartments being initially energized, and all of said elements being energized in sequence for predetermined intervals.

5. The invention as claimed in claim 4 including means for cyclically reversing the polarity of the direct current from said supply means adapted to flow through each of said elements, a cycle being completed when all of said elements in said columns which comprise said heat pumps are energized in said sequence.

6. In a system for purifying a fluid medium, the combination comprising a plurality of thermoelectric heat pump units having hot and cold junctions on opposite sides thereof, at least one of said heat pump units being disposed with the hot junction side thereof opposite the hot junction of one of said heat pump units adjacent thereof and with the cold junction side thereof opposite the cold junction side of another of said heat pump units adjacent thereto so as to define a pair of compartments on opposite sides thereof, each of said heat pump units comprising a plurality of thermocouple elements provided by tapered bodies of thermoelectrically active material having conductive members on opposite sides thereof, said elements being disposed in a column with adjacent ones of said bodies in said column having the wide and narrow ends adjacent each other, and the wide ends of said bodies being disposed below the narrow ends thereof in said column, whereby each of said compartments is divided into a plurality of tapered cells communicating with each other.

7. The invention as recited in claim 6 including direct current power supply means for energizing all of said thermocouple elements simultaneously, and means for cyclically reversing the direction of current flow from said power supply means through each of said elements.

8. In a system for purifying a fluid medium, the combination comprising a plurality of thermoelectric heat pump units providing heated and cooled surfaces on opposite sides thereof, means for mounting said heat pump units with said cooled and said heated surfaces of different ones thereof opposed to form compartments therebetween, means for selectively admitting said medium to be purified into said compartments, means for selectively withdrawing said medium from said compartments in the fluid state, and means for controlling said last two named means for admitting only into the ones of said compartments formed by said cooled surfaces said fluid medium to be purified and for withdrawing said fluid in the fluid state after purification thereof only from the ones of said compartments formed by said heated surfaces.

References Cited by the Examiner

UNITED STATES PATENTS

| | | | |
|---|---|---|---|
| 706,511 | 8/02 | Barrath | 62—348 |
| 2,542,892 | 2/51 | Bayston | 62—348 |
| 2,575,892 | 11/51 | Roberts | 62—348 |
| 2,779,172 | 1/57 | Lindenblad | 62—3 |

NORMAN YUDKOFF, *Primary Examiner.*